(12) United States Patent
Lin et al.

(10) Patent No.: US 11,669,779 B2
(45) Date of Patent: Jun. 6, 2023

(54) PRUDENT ENSEMBLE MODELS IN MACHINE LEARNING WITH HIGH PRECISION FOR USE IN NETWORK SECURITY

(71) Applicant: Zscaler, Inc., San Jose, CA (US)

(72) Inventors: Dianhuan Lin, Sunnyvale, CA (US);
Rex Shang, Los Altos, CA (US);
Changsha Ma, Palo Alto, CA (US);
Kevin Guo, Milpitas, CA (US); Howie Xu, Palo Alto, CA (US)

(73) Assignee: Zscaler, Inc., San Jose, CA (US)

( * ) Notice: Subject to any disclaimer, the term of this patent is extended or adjusted under 35 U.S.C. 154(b) by 1073 days.

(21) Appl. No.: 16/377,129

(22) Filed: Apr. 5, 2019

(65) Prior Publication Data
US 2020/0320438 A1    Oct. 8, 2020

(51) Int. Cl.
*H04L 29/00*     (2006.01)
*G06N 20/20*    (2019.01)
*G06F 21/55*     (2013.01)

(52) U.S. Cl.
CPC .......... *G06N 20/20* (2019.01); *G06F 21/554* (2013.01); *G06F 2221/033* (2013.01)

(58) Field of Classification Search
CPC ...... G06N 20/20; G06N 3/0454; G06N 5/003; G06F 21/554; G06F 2221/033; G06F 21/564
See application file for complete search history.

(56) References Cited

U.S. PATENT DOCUMENTS

| | | | |
|---|---|---|---|
| 9,152,789 B2 | 10/2015 | Natarajan et al. | |
| 2014/0237597 A1* | 8/2014 | Zhang | G06F 21/60 726/23 |
| 2015/0052609 A1* | 2/2015 | Jordan | H04L 63/1416 726/23 |
| 2017/0353481 A1* | 12/2017 | Kong | H04L 63/1425 |
| 2018/0124085 A1* | 5/2018 | Frayman | G06N 20/20 |

(Continued)

OTHER PUBLICATIONS

Jordaney, Roberto, et al. "Transcend: Detecting concept drift in malware classification models." 26th {USENIX} Security Symposium ({USENIX} Security 17). 2017.

(Continued)

*Primary Examiner* — Ghazal B Shehni
(74) *Attorney, Agent, or Firm* — Baratta Law PLLC; Lawrence A. Baratta, Jr.; Ryan Odessa

(57) ABSTRACT

Systems and methods include receiving a content item between a user device and a location on the Internet or an enterprise network; utilizing a trained machine learning ensemble model to determine whether the content item is malicious; responsive to the trained machine learning ensemble model determining the content item is malicious or determining the content item is benign but such determining is in a blind spot of the trained ensemble model, performing further processing on the content item; and, responsive to the trained machine learning ensemble model determining the content item is benign with such determination not in a blind spot of the trained machine learning ensemble model, allowing the content item. A blind spot is a location where the trained machine learning ensemble model has not seen any examples with a combination of features at the location or has examples with conflicting labels.

17 Claims, 8 Drawing Sheets

(56) References Cited

U.S. PATENT DOCUMENTS

2018/0165597 A1* 6/2018 Jordan .................... H04L 43/16
2018/0293381 A1   10/2018 Tseng et al.
2019/0065746 A1* 2/2019 Alsulami ................ G06F 16/16
2020/0125728 A1* 4/2020 Savir ..................... G06F 21/562
2020/0213325 A1* 7/2020 Scherman ............. H04L 63/104

OTHER PUBLICATIONS

Kantchelian, Alex, J. D. Tygar, and Anthony Joseph. "Evasion and hardening of tree ensemble classifiers." International Conference on Machine Learning. 2016.

Tolomei, Gabriele, et al. "Interpretable predictions of tree-based ensembles via actionable feature tweaking." Proceedings of the 23rd ACM SIGKDD International Conference on Knowledge Discovery and Data Mining. ACM, 2017.

* cited by examiner

PRUDENT ENSEMBLE MODELS IN MACHINE LEARNING WITH HIGH PRECISION FOR USE IN NETWORK SECURITY

FIELD OF THE DISCLOSURE

The present disclosure relates generally to Machine Learning (ML) systems and methods for use in network security. More particularly, the present disclosure relates to systems and methods for prudent ensemble models in machine learning with high precision for use in network security.

BACKGROUND OF THE DISCLOSURE

Machine learning techniques are proliferating and offer many use cases. In network security, use cases for machine learning include malware detection, identifying malicious files for further processing such as in a sandbox, user or content risk determination, intrusion detection, etc. Of note, machine learning precision is critical and the focus of research. After trying all possible approaches to improve precision, when given a fixed model, how can one further increase precision without retraining an ML model? Existing work mainly relies on increasing the probability threshold to boost precision in this case. Specifically, the prediction probability measures the likelihood of an example given an ML model. There is a correlation between the precision and probability threshold. The precision goes up with the increase in probability threshold. However, there are non-negligible false predictions even with a high probability threshold. How can one further improve precision?

Jordaney, Roberto, et al. "Transcend: Detecting concept drift in malware classification models." 26th {USENIX} Security Symposium ({USENIX} Security 17). 2017, the contents of which are incorporated by reference herein, have proposed a metric for the reliability of a prediction using statistical analysis. However, this metric relies on probability and cannot detect a false prediction when the probability is high. It has been determined that many of the false predictions fall into blind spots. As described herein, blind spots of an ML model is a region in feature space, where there is insufficient or conflicting evidence from previously seen data. Blind spots are the target of adversarial attack.

There also have been extensive studies on attacking the blind spots of ensemble models. Examples include Kantchelian, Alex, J. D. Tygar, and Anthony Joseph. "Evasion and hardening of tree ensemble classifiers." International Conference on Machine Learning. 2016, and Tolomei, Gabriele, et al. "Interpretable predictions of tree-based ensembles via actionable feature tweaking." Proceedings of the 23rd ACM SIGKDD International Conference on Knowledge Discovery and Data Mining. ACM, 2017, the contents of each are incorporated by reference herein.

However, the existing approaches for identifying blind spots focus on those near the decision boundary. Specifically, they focus on making minimum perturbation to a feature vector so that the label on the sample change from positive to negative. However, there could be blind spots far away from the decision boundary.

BRIEF SUMMARY OF THE DISCLOSURE

In an embodiment, a method, in a cloud-based security system, includes receiving a content item between a user device and a location on the Internet or an enterprise network; utilizing a trained machine learning ensemble model to determine whether the content item is malicious; responsive to the trained machine learning ensemble model determining the content item is malicious or determining the content item is benign but such determining is in a blind spot of the trained ensemble model, performing further processing on the content item; and, responsive to the trained machine learning ensemble model determining the content item is benign with such determination not in a blind spot of the trained machine learning ensemble model, allowing the content item. A blind spot is a location where the trained machine learning ensemble model has not seen any examples with a combination of features at the location or has examples with conflicting labels. The method can further include training the trained machine learning ensemble model to identify malicious content items; and identifying and marking blind spots in the trained machine learning ensemble model. The method can further, subsequent to the further processing, one of allowing the content item and blocking the content item based on the further processing. The further processing can include performing a dynamic analysis on the content item in a sandbox. The content item can be one of an executable file, a Portable Document File (PDF) file, a Microsoft Office file, and a JavaScript file. The cloud-based security system can be located inline between the user device and the location.

In another embodiment, a system includes a network interface communicatively coupled to a user device; a processor communicatively coupled to the network interface; and memory storing computer-executable instructions that, when executed, cause the processor to: receive a content item between the user device and a location on the Internet or an enterprise network; utilize a trained machine learning ensemble model to determine whether the content item is malicious; responsive to the trained machine learning ensemble model determining the content item is malicious or determining the content item is benign but such determining is in a blind spot of the trained ensemble model, cause performance of further processing on the content item; and, responsive to the trained machine learning ensemble model determining the content item is benign with such determination not in a blind spot of the trained machine learning ensemble model, allow the content item.

In a further embodiment, a non-transitory computer-readable storage medium having computer readable code stored thereon for programming a processor to perform steps of: receiving a content item between a user device and a location on the Internet or an enterprise network; utilizing a trained machine learning ensemble model to determine whether the content item is malicious; responsive to the trained machine learning ensemble model determining the content item is malicious or determining the content item is benign but such determining is in a blind spot of the trained ensemble model, performing further processing on the content item; and, responsive to the trained machine learning ensemble model determining the content item is benign with such determination not in a blind spot of the trained machine learning ensemble model, allowing the content item.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1 or the like;

DETAILED DESCRIPTION OF THE DISCLOSURE

The present disclosure relates to systems and methods for prudent ensemble models in machine learning with high precision for use in network security. The present disclosure includes new techniques to measure the reliability of predictions made by ensemble models. Specifically, the present disclosure increases an ensemble model's precision potentially at the cost of the recall of the model. The measure of the reliability of predictions is used to filter out unreliable predictions, that is, predictions that fall into blind spots. With filtering out unreliable predictions, the present disclosure i) counters adversarial attacks, including those not just on decision boundary attack, but also those far away from the decision boundary; ii) achieves skyscraper high precision using the novel metric on prediction reliability; and iii) increases model visibility by explicitly exposing the vulnerable part of the model. The present disclosure utilizes the term "prudent" to characterize the ensemble models in that a prediction from the ensemble model is only used if it is reliable, i.e., not in a blind spot. In an embodiment, a trained ensemble model has blind spots identified and marked, and any predictions falling therein are discarded. As described herein, a blind spot is a location where a machine learning model has not seen any examples with the combination of the features at the location or has examples with conflicting labels.

The present disclosure contemplates use in network security, including inline security systems in the cloud which monitor data between the Internet, enterprises, and users. In such systems, latency is critical, and higher precision machine learning models are necessary as false negatives must be avoided. That is, a security system can tolerate a false positive (i.e., a content item that is deemed undesirable or malware, but is actually benign), but cannot tolerate a false negative (i.e., a content item that is deemed benign, but is actually malicious). Since a false positive still has the chance to be corrected by further analysis, while no further analysis will be applied to a false negative. Accordingly, machine learning precision is key. High precision is required due to the high cost of false predictions. In an embodiment, the present disclosure can be used to increase the precision of determining whether or not to sandbox (quarantine) a content item for further analysis in an inline security system. Other embodiments are also contemplated.

Example Cloud System Architecture

Figure 1:
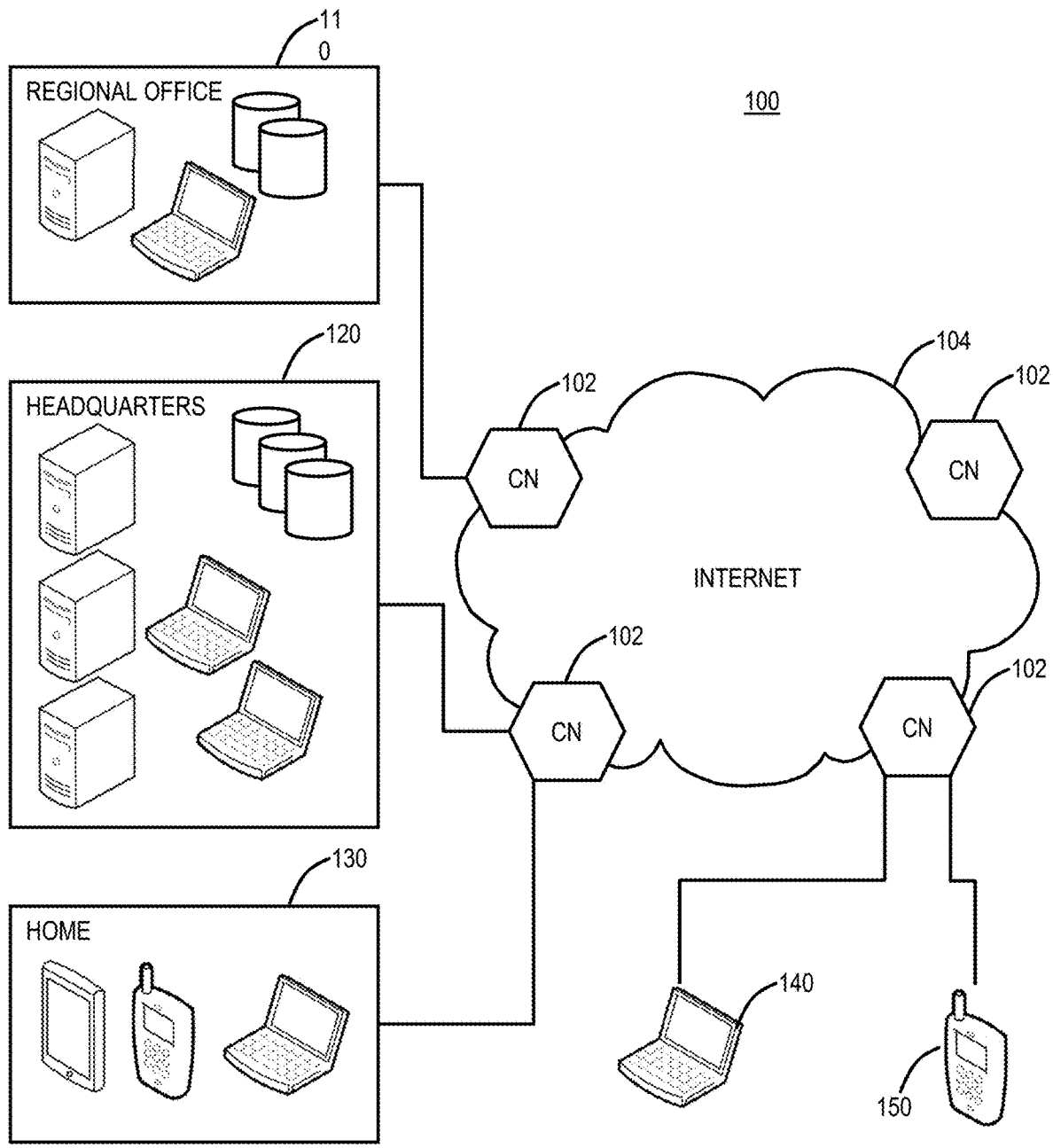
FIG. 1 is a network diagram of a cloud-based system for implementing various cloud-based service functions.
Figure 2:
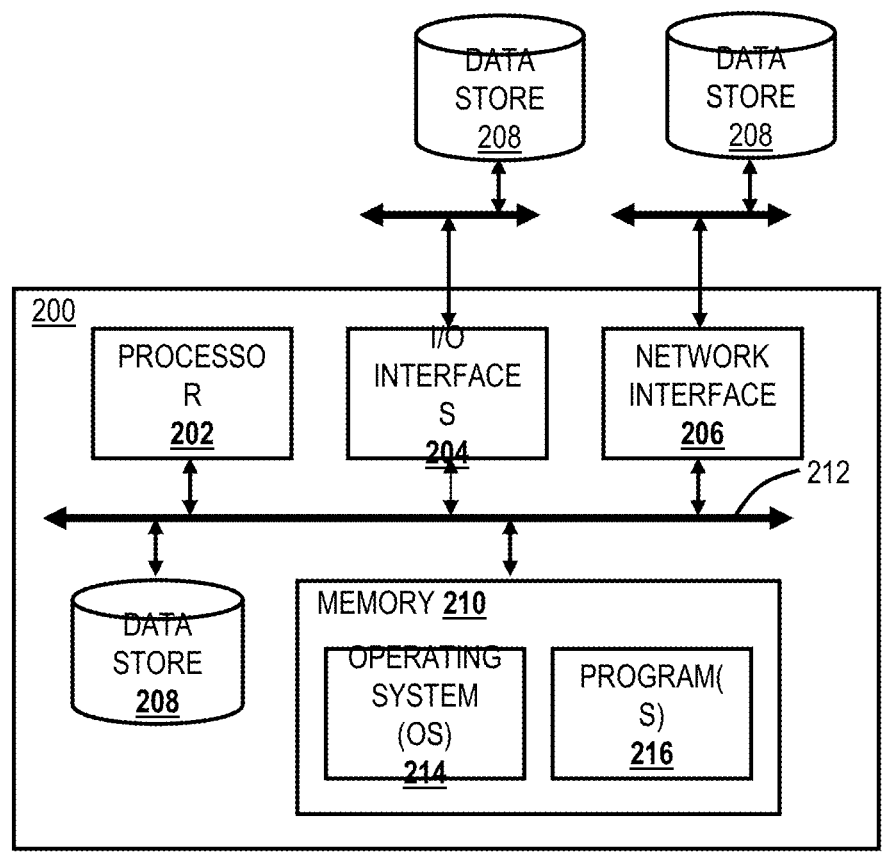

FIG. 1 is a network diagram of a cloud-based system 100 for implementing various cloud-based service functions. The cloud-based system 100 includes one or more cloud nodes (CN) 102 communicatively coupled to the Internet 104 or the like. The cloud nodes 102 may be implemented as a server 200 (as illustrated in FIG. 2), or the like, and can be geographically diverse from one another such as located at various data centers around the country or globe. For illustration purposes, the cloud-based system 100 can include a regional office 110, headquarters 120, various employee's homes 130 with associated devices, laptops/desktops 140, and mobile devices 150 each of which can be communicatively coupled to one of the cloud nodes 102. These locations 110, 120, 130 and devices 140, 150 are shown for illustrative purposes, and those skilled in the art will recognize there are various access scenarios to the cloud-based system 100 all of which are contemplated herein.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, etc.

Two example services include Zscaler Internet Access (ZIA) (which can generally be referred to as Internet Access (IA)) and Zscaler Private Access (ZPA) (which can generally be referred to as Private Access (PA)), from Zscaler, Inc. (the assignee/applicant of the present application). The IA service can include firewall, threat prevention, Deep Packet Inspection (DPI), Data Leakage Prevention (DLP), and the like. The PA can include access control, micro service segmentation, etc. For example, the IA service can provide a user with secure Internet Access and the PA service can provide a user with access to enterprise resources in lieu of traditional Virtual Private Networks (VPNs).

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein contemplate operation with any cloud-based system.

In an embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as malware detection, spam filtering, Uniform Resource Locator (URL) filtering, antivirus protection, bandwidth control, DLP, zero-day vulnerability protection, policy enforcement, web 2.0 features, and the like. In an embodiment, the cloud-based system 100 may be viewed as Security-as-a-Service through the cloud, such as the IA.

In an embodiment, the cloud-based system 100 can be configured to provide security and policy systems and methods. The mobile device 150 may include common devices such as laptops, smartphones, tablets, netbooks, personal digital assistants, MP3 players, cell phones, e-book readers, and the like. The cloud-based system 100 is configured to provide inline security and policy enforcement for devices in the cloud. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, geographical distribution of the cloud nodes 102, policy shadowing of users which is dynamically available at the cloud nodes 102, etc.

When providing inline security, the cloud-based system 100 is required to minimize latency for user experience while avoiding incorrect classifications. For example, a cloud node 102 is located between a user device and the Internet 104 and/or an enterprise network. The cloud node 102 can perform processing on content items exchanged therebetween. As described herein, a content item can include a packet, a file (any type), an email, a streaming session, a resource such as defined by a Uniform Resource Locator (URL), etc. The cloud node 102 can include various data inspection engines that are configured to perform a threat classification on a content item, e.g., clean, spyware, malware, undesirable content, innocuous, spam email, unknown, etc. In an embodiment, the threat classification may be reduced to a subset of categories, e.g., violating, non-violating, neutral, unknown. The threat classification can be utilized to determine appropriate actions such as allow, block, warn, perform further processing, etc.

Example Server Architecture

FIG. 2 is a block diagram of a server 200 which may be used in the cloud-based system 100, in other systems, or standalone. For example, the cloud nodes 102 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Machine Learning in Network Security

In the context of the cloud-based system 100 as an inline security system, machine learning can be used in various applications including malware detection, intrusion detection, threat classification, user or content risk, detecting malicious clients or bots, etc. In a particular use case, machine learning can be used on a content item, e.g., a file, to determine if further processing is required during inline processing. For example, machine learning can be used in conjunction with a sandbox to identify malicious files. A sandbox as the name implies is a safe environment where a file can be executed, opened, etc. for test purposes to determine whether the file is malicious or benign. It can take a sandbox around 10 minutes before it is fully determined whether the file is malicious or benign.

Machine learning can determine a verdict in advance before a file is sent to the sandbox. If a file is predicted as benign, it does not need to be sent to the sandbox. Otherwise, it is sent to the sandbox for further analysis/processing. Advantageously, utilizing machine learning to pre-filter a file significantly improves user experience by reducing the overall quarantine time as well as reducing workload in the sandbox. Of course, machine learning cannot totally replace the sandbox since malicious information from a static file is limited while the sandbox can get a more accurate picture with a dynamic behavior analysis. Further, it follows that the machine learning predictions require high precision due to the impact of a false prediction, i.e., finding a malicious file to be benign.

In the context of inline processing, sandboxing does a great job in detecting malicious files, but there is a cost in latency, which affects user experience. Machine learning can alleviate this issue by giving an earlier verdict on the static files. However, it requires ML to have extremely high precision, since the cost of a false positive and false negative are very high. For example, a benign hospital life-threatening file if mistakenly blocked due to an ML model's wrong verdict would cause life disaster. Similarly, undetected ransomware could cause problems for an enterprise. Therefore, there is a need for a high-precision approach for both benign and malicious files.

The conventional approach to improve precision includes improving the probability threshold to increase precision. A p-value (probability value) is a statistical assessment for measuring the reliability of a prediction, but this does not identify the unreliability of predictions with high probabilities.

A description utilizing machine learning in the context of malware detection is described in commonly-assigned U.S. patent application Ser. No. 15/946,706, filed Apr. 5, 2018, and entitled "System and method for malware detection on a per packet basis," the content of which is incorporated by reference herein. As described here, the typical machine learning training process collects millions of malware samples, extracts a set of features from these samples, and feeds the features into a machine learning model to determine patterns in the data. The output of this training process is a machine learning model that can predict whether a file that has not been seen before is malicious or not.

Decision Tree

In an embodiment, a generated machine learning model is a decision tree. A trained model may include a plurality of decision trees. Each of the plurality of decision trees may include one or more nodes, one or more branches, and one or more termini. Each node in the trained decision tree represents a feature and a decision boundary for that feature. Each of the one or more termini is, in turn, associated with an output probability. Generally, each of the one or more nodes leads to another node via a branch until a terminus is reached and an output score is assigned.

Figure 3:
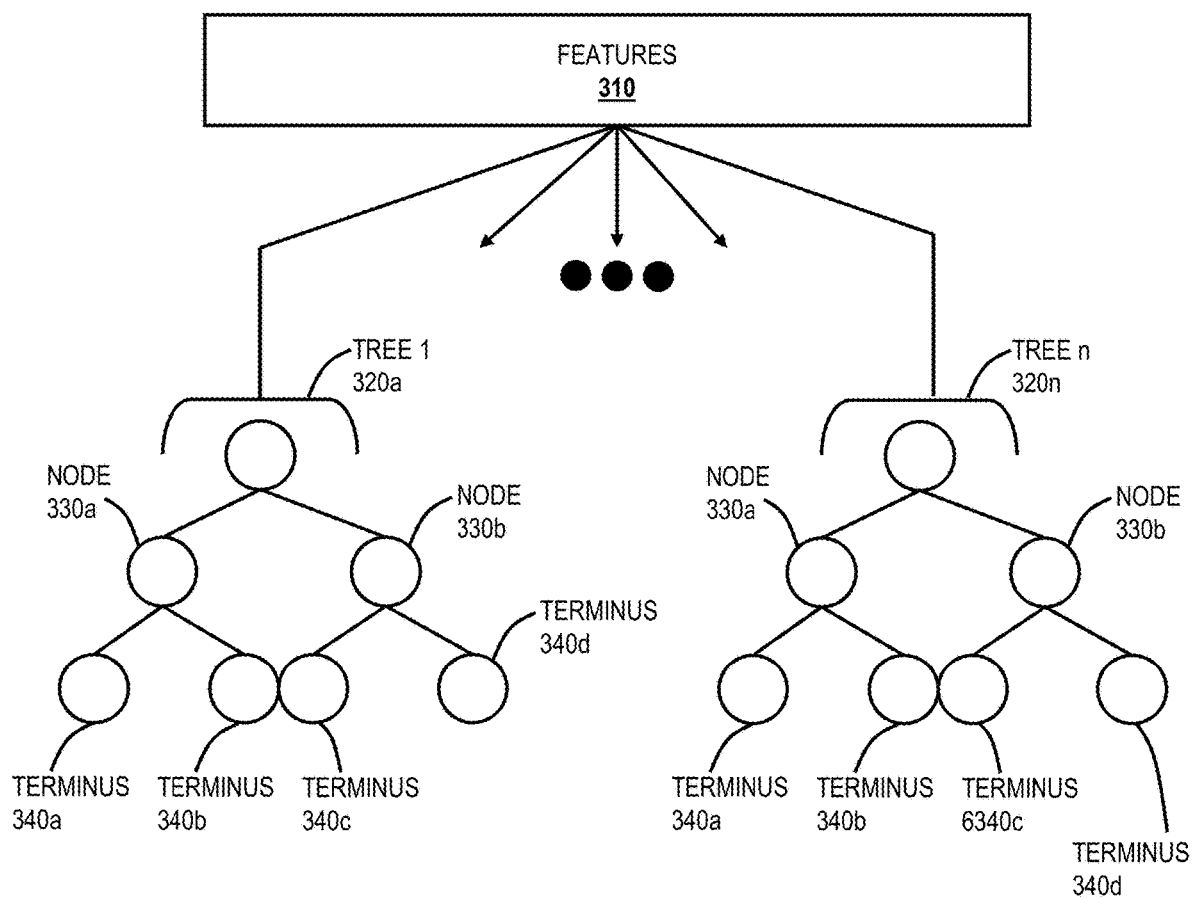
FIG. 3 is a diagram of a trained machine learning model in the form of a decision tree.

FIG. 3 is a diagram of a trained machine learning model 300. The machine learning model 300 includes one or more features 310 and multiple trees 320a, 320n. A feature is an individual measurable property or characteristic of a phenomenon being observed. The trees 320a, 320n can be decision trees associated with a random forest or a gradient boosting decision trees machine learning model. In various embodiments, the trees 320a, 320b are constructed during training. While the machine learning model 300 is only depicted as having trees 320a, 320n, in other embodiments the machine learning model 300 includes a plurality of additional trees. The features 310, in the context of malicious file detection, relate to various properties or characteristics of the file.

The trees 320a, 320n include nodes 330a, 330b and termini 340a, 340b, 340c, 340d. That is, the node 330a is connected to termini 340a, 340b and the node 330b is connected to termini 340c, 340 via one or more branches. In other embodiments, the trees 320a, 320n include one or more additional nodes, one or more additional branches, and one or more additional termini. The nodes 330 each represents a feature and a decision boundary for that feature. The termini 340 can each be associated with a probability of maliciousness, in the example of malicious file detection. Generally, each of the one or more nodes leads to another node via a branch until a terminus is reached and a probability of maliciousness is assigned. The output of the trained machine learning model 300 is a weighted average of a probability of maliciousness predicted by each of the trees 320*a* and the tree 320*n*.

Ensemble Models

Multiple different machine learning models can be used as an ensemble model that obtain better predictive performance than could be obtained from any of the constituent machine learning models alone. The individual models in an ensemble model could be tree-based (e.g., the decision tree used by gradient boosting decision trees and random forest) or neural networks or any other machine learning model where the prediction follows a decision path or activation path. For illustration purposes, the foregoing examples relate to decision trees.

The machine learning model 300 is an example of a decision tree. A decision tree is a tool that uses a tree-like model of decisions and their possible consequences, including chance event outcomes, resource costs, and utility. It is one way to display an algorithm that only contains conditional control statements, i.e., if . . . then . . . else. Random forests or random decision forests are an ensemble model for classification, regression and other tasks that operates by constructing a multitude of decision trees at training time and outputting the class that is the mode of the classes (classification) or mean prediction (regression) of the individual trees. Random decision forests correct for decision trees' habit of overfitting to their training set. Of note, each of the decision trees is independent of one another in the case of Random Forest. Gradient Boosting Decision Trees are dependent between one another. Gradient boosting is a machine learning technique for regression and classification problems, which produces a prediction model in the form of an ensemble of weak prediction models, typically a decision tree.

Blind Spots

Instance-based machine learning approaches make predictions based on its neighbor, that is, the examples similar to it. On the other hand, if there are no similar examples surrounding the example under prediction, there is insufficient support for the prediction. Thus, the prediction is untrustworthy. An instance-based approach needs a similarity threshold to decide whether there are similar examples. However, the similarity is relative and not absolute. The similarity is also feature dependent. Again, blind spots in a machine learning model are regions in a feature space defined by ensemble trees where there is insufficient or conflicting evidence from previously seen data (e.g., training). Blind spots are the target of adversarial attacks where the models are fooled with malicious input. Machine learning models are unable to make accurate predictions at blind spots.

For an example of a blind spot, is broccoli more similar to cauliflower or kale? It is clear that from the shape perspective, broccoli is closer to cauliflower. While if the green color is the dominant feature, then broccoli becomes closer to kale. Thus, this model requires additional features as shape and color alone are not sufficient for distinguishing examples.

Prudent Ensemble Models

The present disclosure includes measuring the reliability of a prediction to provide confidence/over prediction. These reliability measures can also be double checked and tracked, to further improve the measurement of reliability. For example, in the malicious content item detection use case, the unreliability predictions could be doubled checked by a sandbox. The unreliability predictions can increase precision by filtering out unreliable predictions. If a prediction is made, it has very high precision. While for those it is not sure, they can be analyzed further to identify malware concept drift or discrepancy in data distribution.

Figure 4:
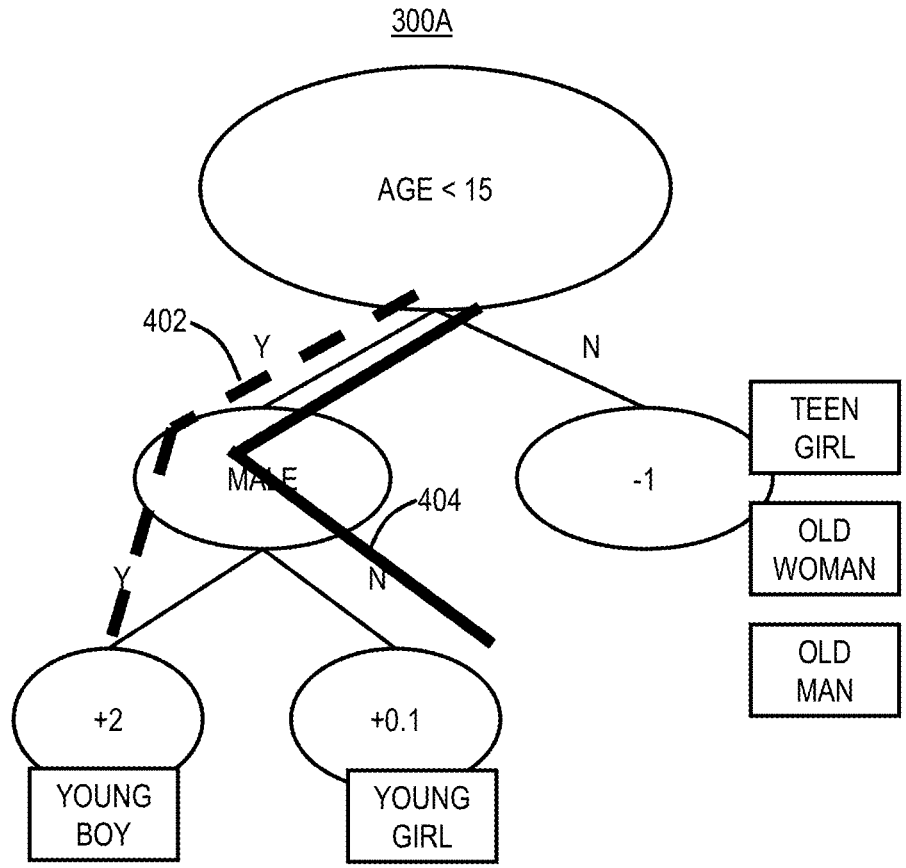
FIG. 4 is a diagram of a simplified prudent ensemble model using two decision trees for illustrating the concepts of the present disclosure.
Figure 4:
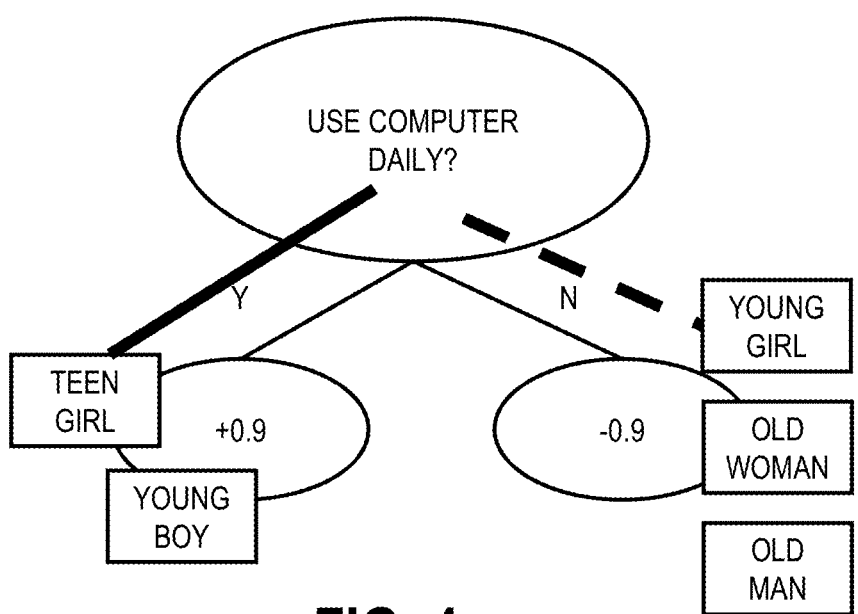

FIG. 4 is a diagram of a simplified prudent ensemble model 400 using decision trees 300A, 300B for illustrating the concepts of the present disclosure. Specifically, the prudent ensemble model 400 is a machine learning model to predict whether a person loves playing computer games. The prudent ensemble model 400 can be a gradient boosted decision tree where the ensemble score is the sum of scores from each path. The larger the positive score, the more likely to love playing; the more negative the score, the more unlikely to love playing computer games. The ensemble score can be converted to a probability using the sigmoid function.

There are three paths in the tree 300A and two paths in the tree 300B. Thus, there are six combinations in total. Five examples are used here—a young boy, a young girl, a teen girl, an old woman, and an old man. For the young boy, (a) age<15 (b) male (c) use a computer daily for a score of +2+0.9=2.9 indicative of a love of playing computer games. For the old man or old woman, (a) age>15 (b) NOT use a computer daily for a score of −1−0.9=−1.9 indicative of no love of playing computer games.

However, with these examples, there are two blind spots in this model 400 which are denoted by paths 402, 404. Since we have not yet observed any young boy who does NOT user computer daily or any young girl who use computer daily. For a young boy who does NOT use computer daily, (a) age<15 (b) male (c) NOT use computer daily for a score of 2.0−0.9=1.1. For a young girl who use computer daily, (a) age<15 (b) female (c) use computer daily for a score of 0.1+0.9=1.0. These are blind spots leading to unreliable predictions. The model 400 has not been trained or observed anyone with that particular combination of attributes.

Figure 5:
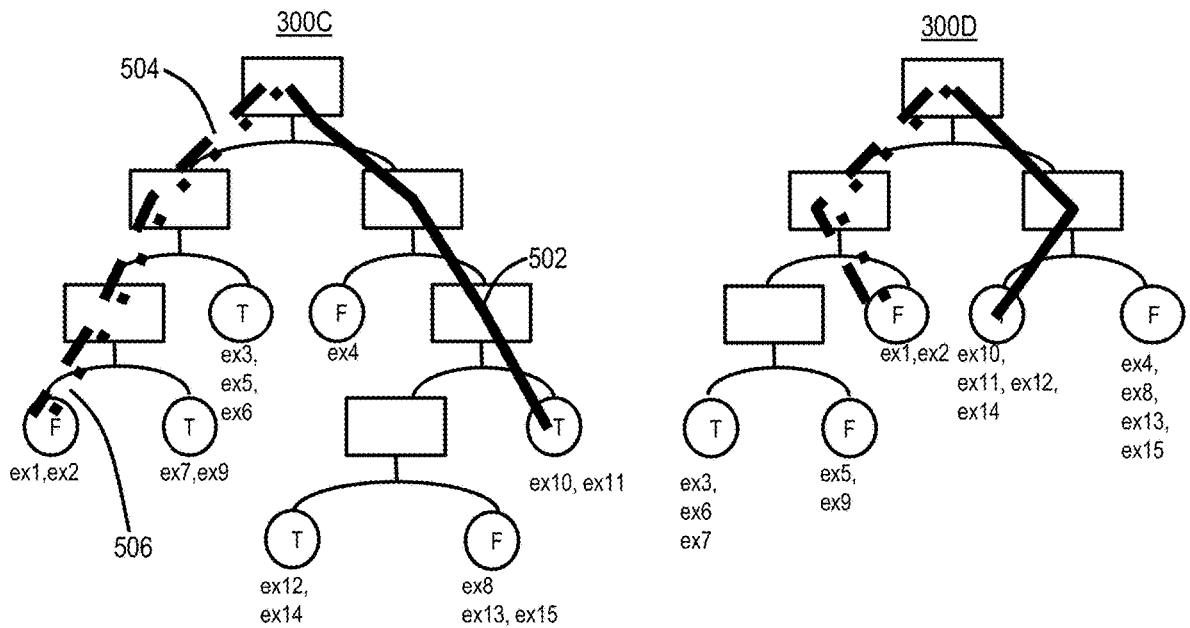
FIG. 5 is a diagram of another simplified prudent ensemble model using decision trees for illustrating blind spots.
Figure 5:
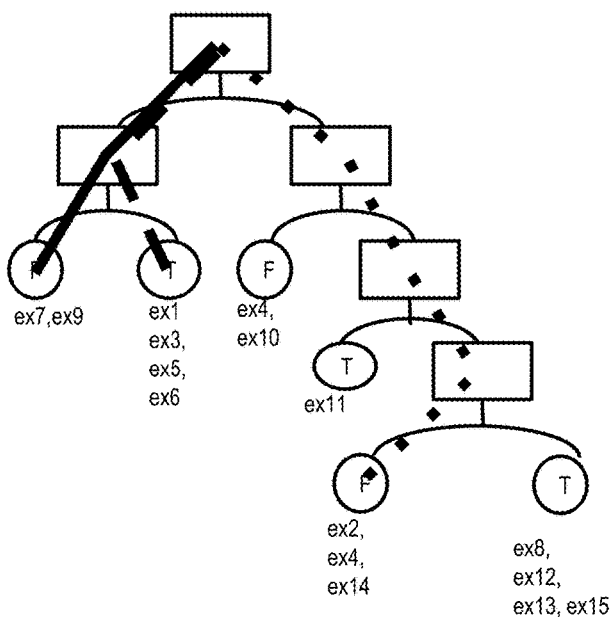

FIG. 5 is a diagram of another simplified prudent ensemble model 500 using decision trees 300C, 300D, 300E for illustrating the concepts of the present disclosure. Again, both random forest and gradient boosting decision trees 300 make decisions based on a combination of paths. FIG. 5 is used to further illustrate blind spots. Each terminus in the decision trees 300C, 300D, 300E have associated examples ex1-ex15. For simplification and illustration purposes, the termini have a True or False designation. Of course, a practical example could include weights, etc.

Three highlighted paths 502, 504, 506 are illustrated in each tree 300C, 300D, 300E. The path 502 has no common examples in any of the trees 300C, 300D, 300E. This means the machine learning model 500 has not seen any examples with the combination of these features or has examples with conflicting labels. Thus, this forms a blind spot.

In contrast, the path 506 has ex2 in common. Thus, this is not a blind spot. Similarly, the path 504 has ex1 in common. Thus, it is reliable. Although ex1 have a false prediction from two of the models and one true prediction from the third model, it could be predicted as positive or negative, depending on the actual score of each path. This still follows the original principles of ensemble models.

Prudent Ensemble Model Process

Figure 6:
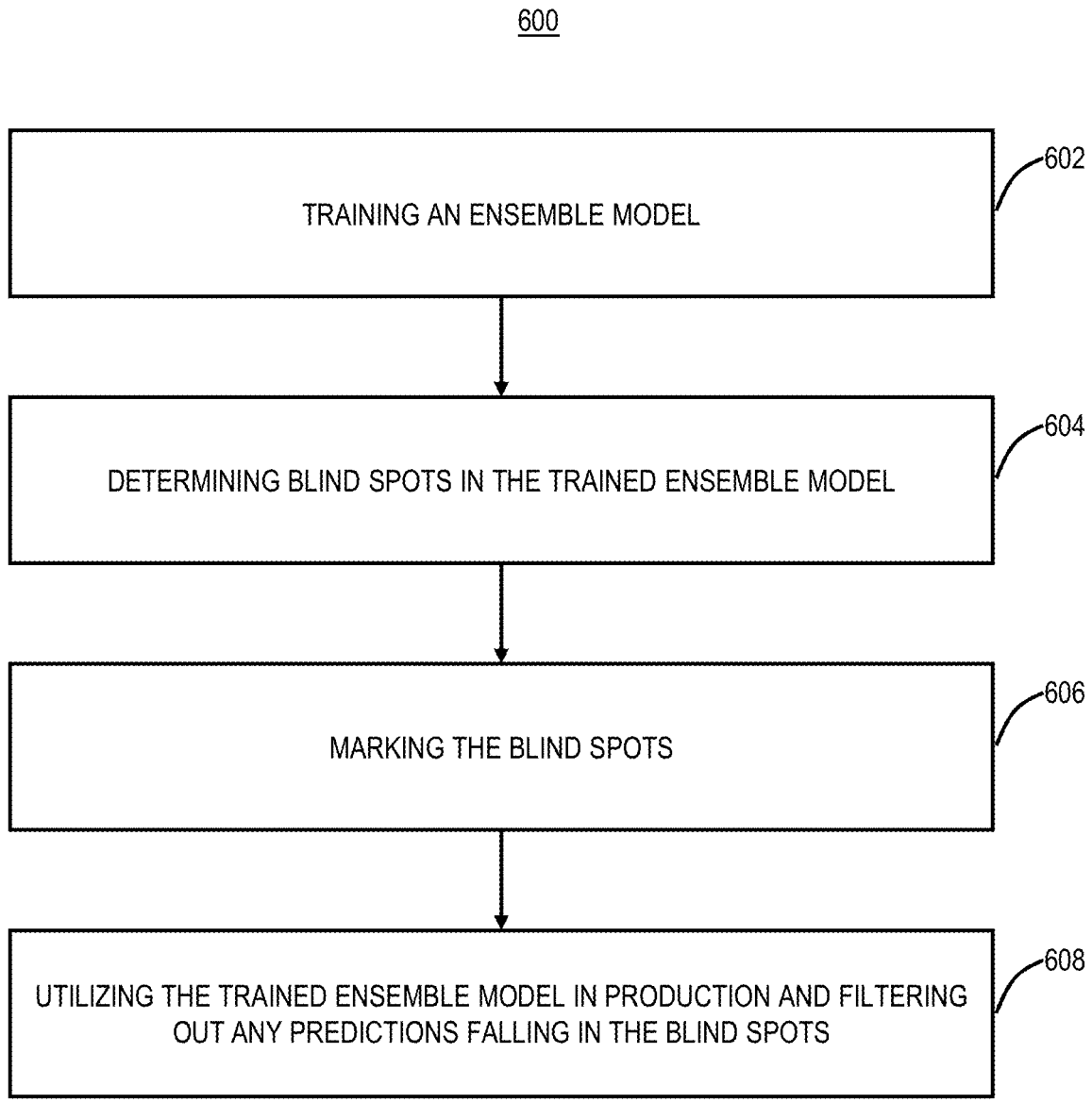
FIG. 6 is a flowchart of a prudent ensemble model process.

FIG. 6 is a flowchart of a prudent ensemble model process 600. The process 600 includes training an ensemble model (step 602). This step proceeds as is known in the machine learning art. As described herein, the ensemble model could be tree-based (e.g., the decision tree used by gradient boosting decision trees and random forest) or neural networks or any other machine learning model where the prediction follows a decision path or activation path.

The process 600 includes determining blind spots in the trained ensemble model (step 604). Again, a blind spot is a location where the trained ensemble model has not seen any examples with the combination of the features at the location or has examples with conflicting labels. The determined blind spots are marked or otherwise noted (step 606). The trained ensemble model is utilized in production to make predictions, but any predictions that are in marked blind spots are filtered out (ignored) as being unreliable (step 608).

Again, by filtering out unreliable predictions, that is, the predictions that fall into blind spots, the process 600 counters adversarial attacks, including those not just on decision boundary attack, but also those far away from the decision boundary. For example, a malicious file can be configured to fool the model by having characteristics similar to a benign content item, but still being malicious. The process 600 advantageously protects against such attacks as the malicious file that tries to fool the model will end up in a blind spot as such as file would not have existing examples. Accordingly, this file would be rejected due to the blind spot. The process 600 further achieves skyscraper high precision, and the process 600 increases the visibility of the trained ensemble model by explicitly exposing the vulnerable part of the model. The vulnerable part of the model can be improved through further training. The process 600 leverages the idea from instance-based (e.g., k-nearest neighbor) and integrates it into ensemble models to enhance their predictions.

The trained ensemble model uses learned models to define what are similar examples. Ensemble models non-linearly segment the feature space into small regions. Each region is the result of superimposing the decision paths from all sub-models. Examples within the same region are deemed similar. If the prediction paths for an example fall into a region where no examples have been seen previously or only examples with conflicting labels, that means it is a region without sufficient support from examples, thus named blind spots. The blind spots defined in this way can be anywhere in the feature space and do not have to near the decision boundary.

By filtering out predictions fell into blind spots, the process 600 can counter the adversary attack in various regions in feature space (not just those close to decision boundary). This is complementary to existing solutions for the adversarial attack. Since the adversarial examples generated using the existing data is limited. There are still blind spots remaining after the hardening of the model trained with adversary examples, especially those not close to the decision boundary.

Content Processing Process by an Inline Security System

Figure 7:
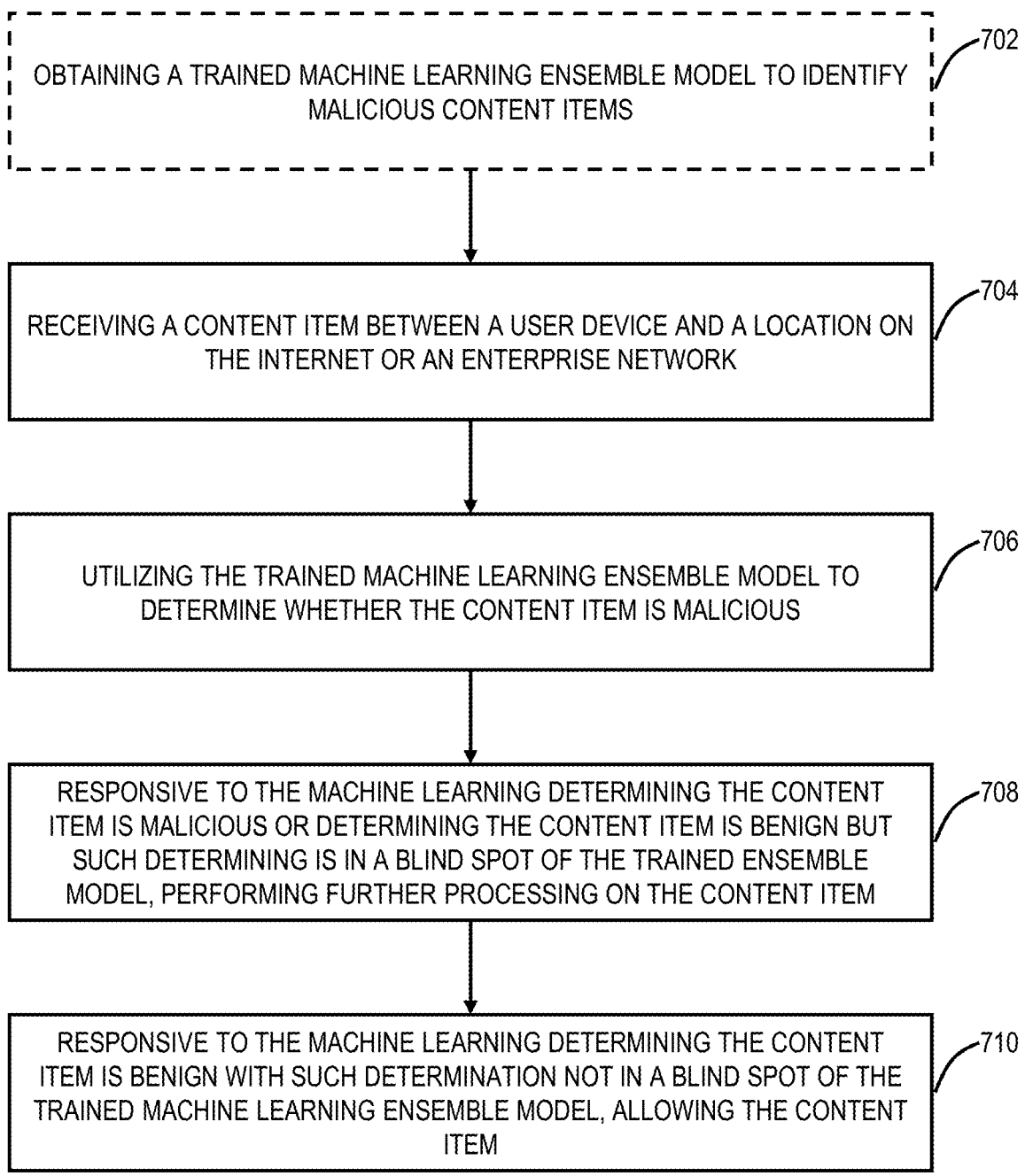
FIG. 7 is a flowchart of a content processing process, implemented by the cloud-based security system.

FIG. 7 is a flowchart of a content processing process 700, implemented by the cloud-based security system 100. The process 700 can include obtaining a trained machine learning ensemble model to identify malicious content items (step 702). The trained machine learning ensemble model can be from the process 600. The process 700 includes receiving a content item between a user device and a location on the Internet or an enterprise network (step 704), utilizing the trained machine learning ensemble model to determine whether the content item is malicious (step 706), responsive to the trained machine learning ensemble model determining the content item is malicious or determining the content item is benign but such determining is in a blind spot of the trained ensemble model, performing further processing on the content item (step 708), and, responsive to the trained machine learning ensemble model determining the content item is benign with such determination not in a blind spot of the trained machine learning ensemble model, allowing the content item (step 710).

As mentioned, the blind spot is a location where the trained machine learning ensemble model has not seen any examples with a combination of features at the location or has examples with conflicting labels. The process 700 can further include training the trained machine learning ensemble model to identify malicious content items, and identifying and marking blind spots in the trained machine learning ensemble model. The process 700 can further include, subsequent to the further processing, one of allowing the content item and blocking the content item based on the further processing.

The further processing can include performing a dynamic analysis on the content item in a sandbox. For example, this can include the analysis described in U.S. Pat. No. 9,152,789, issued Oct. 6, 2015, and entitled "Systems and methods for dynamic cloud-based malware behavior analysis," the contents of which are incorporated by reference herein. In an embodiment, the further processing includes blocking the content item in the cloud-based security system based on a classification by the trained machine learning ensemble model. Here, the trained machine learning ensemble model can be viewed as the final decision without requiring a sandbox or the like.

In an embodiment, the content item is malicious and configured to fool the trained machine learning ensemble model via an adversarial attack where the content item is configured to mimic benign features, and wherein the content item lands on a blind spot in the trained machine learning ensemble model thereby preventing the adversarial attack. The content item can be one of an executable file, a Portable Document File (PDF) file, a Microsoft Office file, and a JavaScript file. The cloud-based security system can be located inline between the user device and the location.

Experimental Results

Figure 8:
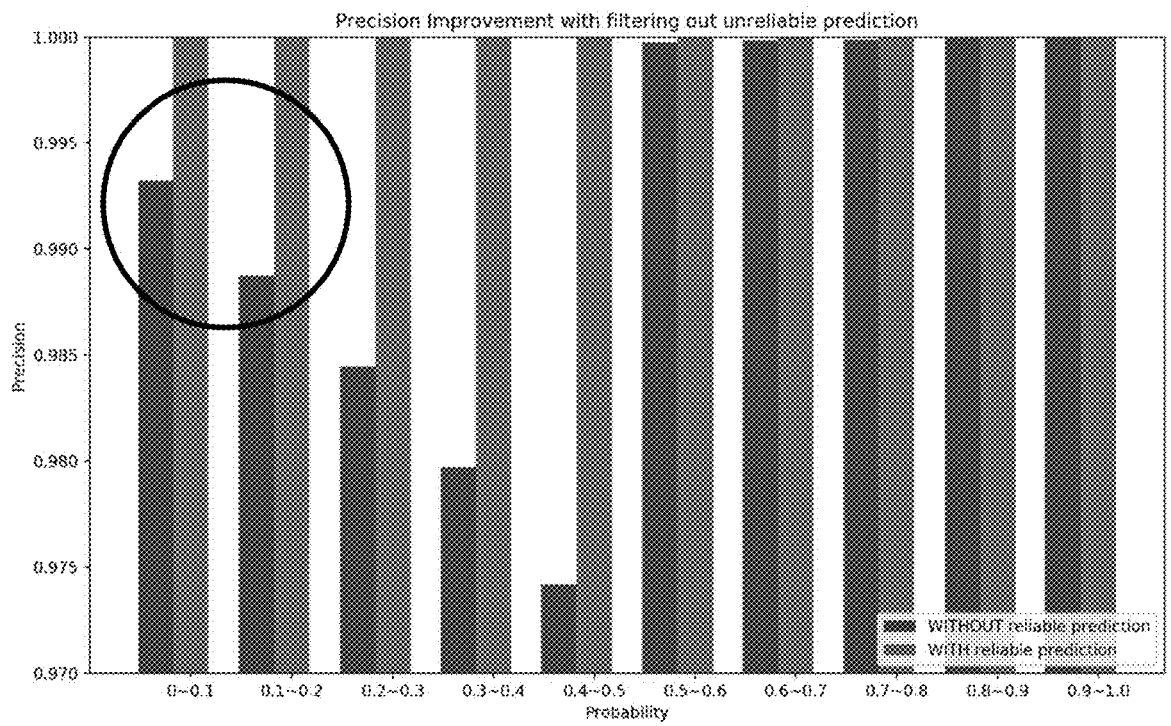
FIG. 8 is a graph of an example of a trained machine learning ensemble model classifying an executable file as benign with and without using the process of FIG. 7.
Figure 9:
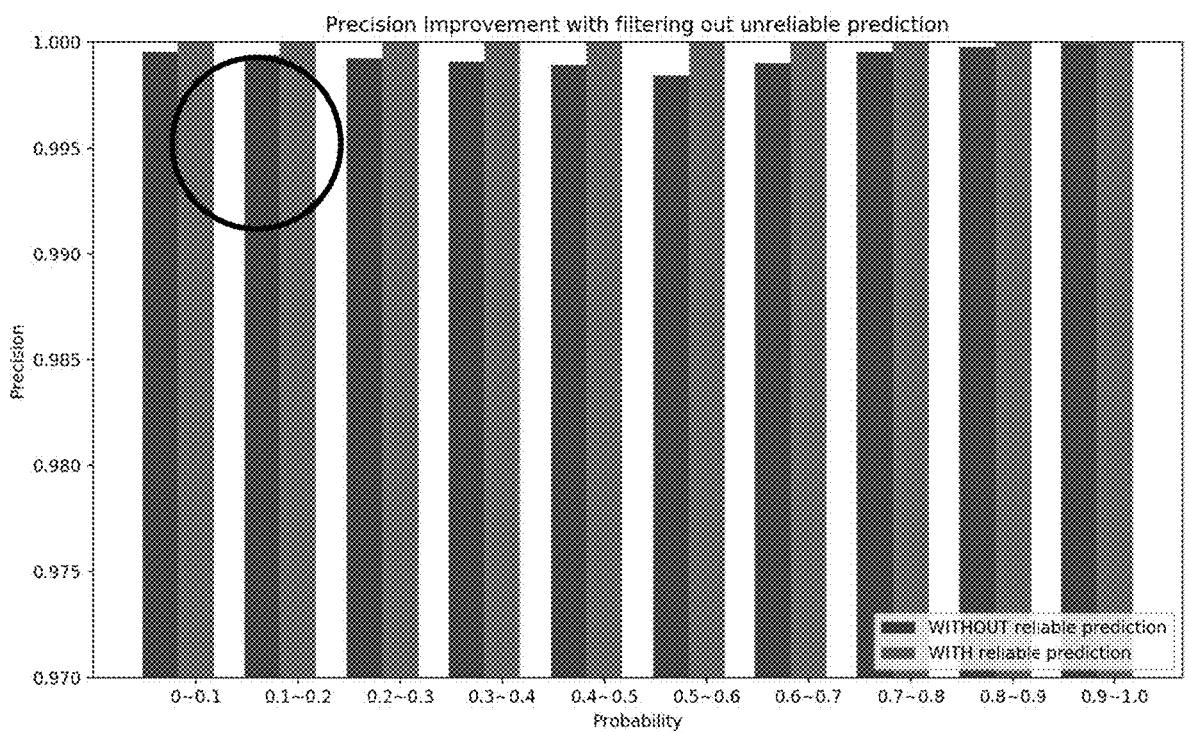
FIG. 9 is a graph of an example of a trained machine learning ensemble model classifying a Portable Document File (PDF) file as benign with and without using the process of FIG. 7.

FIG. 8 is a graph of an example of a trained machine learning ensemble model classifying an executable file as benign with and without using the process 700. FIG. 9 is a graph of an example of a trained machine learning ensemble model classifying a Portable Document File (PDF) file as benign with and without using the process 700. Specifically, FIGS. 8 and 9 are labeled WITHOUT and WITH reliable prediction where WITH reliable prediction implements the process 700. The executable file is a Portable Executable (PE) Windows file. The following tables provide experimental details.

TABLE 1

PE Benign classification

| | Without the process 700 | With the process 700 |
|---|---|---|
| Probability Threshold | 0.005 | 0.5 |
| Precision | 0.999282 | 0.999985 |
| Recall | 0.812 | 0.82 |

TABLE 2

PE Malicious classification

|  | Without the process 700 | With the process 700 |
|---|---|---|
| Probability Threshold | 0.995 | 0.5 |
| Precision | 0.9999969 | 0.9999981 |
| Recall | 0.9197556 | 0.7805490 |

TABLE 3

PDF Benign classification

|  | Without the process 700 | With the process 700 |
|---|---|---|
| Probability Threshold | 0.005 | 0.5 |
| Precision | 0.99986803781 | 1 |
| Recall | 0.98320951723 | 0.82890206092 |

TABLE 4

PDF Malicious classification

|  | Without the process 700 | With the process 700 |
|---|---|---|
| Probability Threshold | 0.995 | 0.9 |
| Precision | 1 | 1 |
| Recall | 0.91146366427 | 0.74998294097 |

The experimental results on detecting malicious files (e.g., PE Microsoft executable and PDF files) show significant improvement in precision, especially when the probability threshold is low. Although this approach appears to come with a cost in the recall, it is only the case when the probability threshold remains the same. As shown in the experimental results, with the filtering out unreliable prediction, the precision stays high. Thus, the probability threshold can be lowered. As a result, the recall for PE benign file even increases by 1%. Precision improvement: 0.07% might appear to be a small percentage, but given the in an inline security system, this means thousands of files would be correctly detected.

For the definition of recall, here is a mini-example, just to provide more clarity on the recall definition. Suppose there are 100 malicious files and 100 benign files. If a model blindly predicts all examples to be malicious, then the recall for malicious files would be 100%, while the precision is only 50% since half of the predictions for malicious are wrong. If another model predicts 50 files to be malicious, 10 of them were wrong (they are actually benign). Then the precision is 80% (40 malicious are correctly detected; so 40/50=0.8), while the recall is 40% since only 40 out of 100 malicious files are detected.

Other Use Cases

While described herein with respect to security, the prudent ensemble models can be used in various applications. The prudent ensemble models are applicable to use cases where high precision is required.

For example, these could be used for bot detection. Websites would like to distinguish human versus bots. If a person's login attempt is mistakenly classified as a bot, it will severely impact user experiences. Thus, reducing false positive prediction is important.

This could also be used in fraud detection. Imagine a customer getting credit card transaction rejected while on a trip including to foreign countries which results in difficulty. While protecting users against fraud, a credit card company does not want to sacrifice the customer experiences. Thus, it is critical to reduce false positive/negatives.

This could also be used to detect abnormal network traffic. A machine learning model could be deployed to detect abnormal network traffic and block account access accordingly. Of course, if someone's account is blocked while having a meeting with customers, a demo or the like could be impacted. Similarity, high precision is critical in such scenarios.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
   in a cloud-based security system, receiving a content item between a user device and a location on the Internet or an enterprise network;
   utilizing a trained machine learning ensemble model to determine whether the content item is malicious;
   determining one or more blind spots in the trained machine learning ensemble model by identifying content items which include combination of features not seen by the trained machine learning ensemble model, or content items which are similar to other content items with conflicting labels, wherein determined blind spots are marked or otherwise noted;
   responsive to the trained machine learning ensemble model determining the content item is malicious or determining the content item is benign but such determining is in a blind spot of the trained ensemble model, performing further processing on the content item; and
   responsive to the trained machine learning ensemble model determining the content item is benign with such determination not in a blind spot of the trained machine learning ensemble model, allowing the content item.

2. The method of claim 1, further comprising:
   training the trained machine learning ensemble model to identify malicious content items; and
   identifying and marking blind spots in the trained machine learning ensemble model.

3. The method of claim 1, further comprising:
   subsequent to the further processing, one of allowing the content item and blocking the content item based on the further processing.

4. The method of claim 1, wherein the further processing includes performing a dynamic analysis on the content item in a sandbox.

5. The method of claim 1, wherein the further processing includes blocking the content item in the cloud-based security system based on a classification by the trained machine learning ensemble model.

6. The method of claim 1, wherein the content item is malicious and configured to fool the trained machine learning ensemble model via an adversarial attack where the content item is configured to mimic benign features, and wherein the content item lands on a blind spot in the trained machine learning ensemble model thereby preventing the adversarial attack.

7. The method of claim 1, wherein the content item is one of an executable file, a Portable Document File (PDF) file, a Microsoft Office file, and a JavaScript file.

8. The method of claim 1, wherein the cloud-based security system is located inline between the user device and the location.

9. A system comprising:
   a network interface communicatively coupled to a user device;
   a processor communicatively coupled to the network interface; and
   memory storing computer-executable instructions that, when executed, cause the processor to:
      receive a content item between the user device and a location on the Internet or an enterprise network;
      utilize a trained machine learning ensemble model to determine whether the content item is malicious;
      determine one or more blind spots in the trained machine learning ensemble model by identifying content items which include combination of features not seen by the trained machine learning ensemble model, or content items which are similar to other content items with conflicting labels, wherein determined blind spots are marked or otherwise noted;
      responsive to the trained machine learning ensemble model determining the content item is malicious or determining the content item is benign but such determining is in a blind spot of the trained ensemble model, cause performance of further processing on the content item; and
      responsive to the trained machine learning ensemble model determining the content item is benign with such determination not in a blind spot of the trained machine learning ensemble model, allow the content item.

10. The system of claim 9, wherein the memory storing computer-executable instructions that, when executed, cause the processor to:
    train the trained machine learning ensemble model to identify malicious content items; and
    identify and mark blind spots in the trained machine learning ensemble model.

11. The system of claim 9, wherein the memory storing computer-executable instructions that, when executed, cause the processor to:
    subsequent to the further processing, one of allow the content item and block the content item based on the further processing.

12. The system of claim 9, wherein the further processing includes performing a dynamic analysis on the content item in a sandbox.

13. The system of claim 9, wherein the content item is one of an executable file and a Portable Document File (PDF) file.

14. A non-transitory computer-readable storage medium having computer readable code stored thereon for programming a processor to perform steps of:
    receiving a content item between a user device and a location on the Internet or an enterprise network;
    utilizing a trained machine learning ensemble model to determine whether the content item is malicious;
    determining one or more blind spots in the trained machine learning ensemble model by identifying content items which include combination of features not seen by the trained machine learning ensemble model, or content items which are similar to other content items with conflicting labels, wherein determined blind spots are marked or otherwise noted;
    responsive to the trained machine learning ensemble model determining the content item is malicious or determining the content item is benign but such determining is in a blind spot of the trained ensemble model, performing further processing on the content item; and
    responsive to the trained machine learning ensemble model determining the content item is benign with such determination not in a blind spot of the trained machine learning ensemble model, allowing the content item.

15. The non-transitory computer-readable storage medium of claim 14, wherein the computer readable code is further configured for programming the processor to perform steps of:
    training the trained machine learning ensemble model to identify malicious content items; and
    identifying and marking blind spots in the trained machine learning ensemble model.

16. The non-transitory computer-readable storage medium of claim 14, wherein the computer readable code is further configured for programming the processor to perform steps of:

subsequent to the further processing, one of allowing the content item and blocking the content item based on the further processing.

17. The non-transitory computer-readable storage medium of claim 14, wherein the further processing includes performing a dynamic analysis on the content item in a sandbox.

* * * * *